UNITED STATES PATENT OFFICE 2,443,494

PREPARATION OF UNSATURATED CHLORONITRILES

Oliver W. Cass, Niagara Falls, N. Y., assignor to E. I. du Pont de Nemours & Company, Wilmington, Del., a corporation of Delaware No Drawing. Application October 21, 1944, Serial No. 559,833

8 Claims. (Cl. 204—163)

This application relates to the production of novel chlorinated products and to a process for the production thereof. More particularly, it relates to the production of novel chlorine compounds of maleonitrile and fumaronitrile.

An object of this invention is to provide a process for the production of chloromaleonitriles and chlorofumaronitriles. Another object is the preparation of the new compounds, monochloromaleonitrile, monochlorofumaronitrile, dichloromaleonitrile, and dichlorofumaronitrile. A further object of this invention is to provide a process for the production of these chloronitriles which is economical and efficient and suitable for large-scale operation. These and other objects will be apparent from the ensuing description of the invention.

The foregoing objects are attained in accordance with my invention by reacting succinonitrile with chlorine in the liquid phase.

I have discovered that chlorination of succinonitrile results in the production of the unsaturated chloronitriles, monochloromaleonitrile, dichloromaleonitrile, monochlorofumaronitrile, and dichlorofumaronitrile.

That these unsaturated chloronitriles should be obtained by chlorination of succinonitrile under the conditions of my invention is entirely unexpected. The formation of these compounds is due not to simple addition of chlorine to the succinonitrile molecule nor the simple substitution of chlorine for hydrogen, but appears to be the result of substitution followed by spontaneous dehydrochlorination. Strangely enough, substantially no saturated chloronitriles are obtained in accordance with the process of my invention, although the products of the reaction contain a double bond which might be expected readily to add chlorine to form saturated chloronitriles. Furthermore, an examination of the formula of succinonitrile does not lead to the prediction that the saturated derivatives of succinonitrile containing hydrogen as well as chlorine would be unstable and thus readily yield chlorine derivatives of maleonitrile and fumaronitrile.

The following equations illustrate the chlorination of succinonitrile in accordance with my invention:

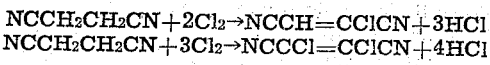

A satisfactory procedure for carrying out the process of my invention is described below. A suitable reaction vessel, preferably lined with glass or other acid-resistant material, is equipped with means for agitation of the reaction mixture and with temperature controls adapted for heating and cooling. An inlet for chlorine and an exit for the off-gases are also provided. The exit should be connected to a suitable absorption system for chlorine and hydrogen chloride. Also the reaction vessel should contain one or more light wells arranged to admit a suitable source of light, for example, an ordinary tungsten filament incandescent bulb.

The succinonitrile to be chlorinated is charged into the reaction vessel, the light turned on, the temperature raised to about 60° C., and agitation begun while chlorine is introduced below the surface of the molten succinonitrile. It has been found that a short induction period exists after which chlorination begins and hydrogen chloride is evolved. As the reaction proceeds the temperature is gradually raised until, at the end of the reaction, temperatures of 100° to 150° C. are reached. When the reaction is complete, as evidenced by lack of further evolution of hydrogen chloride, the contents of the reaction vessel may be blown with air or nitrogen to remove traces of hydrogen chloride. The reaction mixture is then fractionally distilled to purify and separate the chlorination products obtained.

In my preferred method of operation, I utilize no solvent other than the molten succinonitrile as I have found this mode of operation to be satisfactory and my process is therefore simpler and more economical to operate than conventional processes utilizing solvents which must be isolated from the reaction mixture. However, solvents may be used if desired. For example, solvents such as carbon tetrachloride or tetrachloroethane are suitable. Also other solvents inert to the reactants may be utilized.

In the utilization of my invention to produce monochloromaleonitrile and monochlorofumaronitrile, 2 moles of chlorine are used for each mole of succinonitrile. When it is desired to produce dichloromaleonitrile and dichlorofumaronitrile, 3 moles of chlorine are used for each mole of succinonitrile.

I have found that chlorination becomes somewhat slow as the molar ratio of 3 to 1 is approached and, if it is desired to save time, the reaction may be stopped at this point, the higher chlorinated material separated, and the lower chlorinated material recycled for further chlorination.

I have not found it possible to separate the cis and trans isomers of the monochloro compounds from each other. However, the mixture of monochloro isomers, which has a boiling point of 180° C., is readily separated from the succinonitrile, which boils at 265° C., and the dichloro derivatives, which boil at 164° C., by fractional distillation. The isomers of the dichloro compounds on the other hand are easily separated as one of these is a solid which may be isolated by filtration. This isomer is a white solid having a melting point of 53° C.

Separation of the cis and trans isomers of the monochloro maleonitrile and fumaronitrile is unnecessary since the principal value of these compounds resides in their utility as intermediates for the production of other valuable compounds and the mixture is entirely suitable for this purpose.

The chloronitriles which are obtained in accordance with my invention are lachrymators and known precautions for handling such materials should therefore be observed.

I have described the process of my invention with reference to the use of light to activate the chlorination as I have discovered that light activation increases the rate of chlorination and also reduces the induction period ordinarily occurring. Therefore, I prefer to utilize some suitable source of light in conjunction with my novel process. However, the use of light is not essential, and I have found it possible to operate my invention successfully in the absence of light. Although I have found that a tungsten filament incandescent lamp is a suitable source of light for catalyzing the reaction, other types of light may be used with satisfactory results. For example, "fluorescent" or mercury arc lights are also suitable.

The process of my invention may be operated at temperatures above the melting point of succinonitrile but below the boiling point thereof. I prefer to utilize temperatures of about 60° to about 150° C., as I have found that good results are consistently obtained when operating within this range. At temperatures below 55° C. succinonitrile is a solid and thus operation at lower temperatures requires the use of an inert solvent, which complicates the process without introducing any particular advantage. Temperatures above 150° C. may also be utilized, although such temperatures may result in decreased yield of desired product due to side reactions.

The following examples illustrate my invention:

Example 1

Succinonitrile, 586 g. (7.3 moles), was charged to a 1-liter chlorination flask and 300 g. (4.2 moles) of chlorine added at a temperature of 100–120° C. During the reaction, 212 g. (5.8 moles) of hydrogen chloride was eliminated. The crude product was distilled to yield 23 g. (0.63 mole) of hydrogen chloride, 200 g. (2.6 moles) of chloromaleo- and fumaronitriles and 397 g. of recovered succinonitrile.

Example 2

Succinonitrile, 784 g. (9.35 moles) was charged to a 2-liter chlorination flask illuminated by a 200-watt projection lamp. Chlorine, 1680 g. (23.7 moles) was absorbed in 8½ hours at a temperature of 100–140° C. Hydrogen chloride eliminated during the reaction was 1191 g. (32.7 moles). Distillation at atmospheric pressure yielded 55 g. (1.5 moles) of hydrogen chloride and 965 g. liquid boiling at 155–173° C., which is essentially dichloromaleo- and fumaronitriles.

Example 3

Succinonitrile, 1300 g. (15.5 moles) was chlorinated until 2060 g. (56.5 moles) of hydrogen chloride was eliminated. The temperature was maintained at 100 to 150° C. and thirteen hours were required. The reaction mixture was illuminated throughout the reaction period. The product was distilled at 100 mm. and 860 g. of mono- and dichloromaleo- and fumaronitriles was recovered. Steam distillation of the residue produced an additional 260 grams of material. The product contained a predominant amount of the dichloro isomers.

The new products resulting from my invention are useful compounds particularly suitable for the preparation of a wide variety of other compounds not hitherto readily obtainable. For example, either monochlorofumaronitrile, monochloromaleonitrile, dichlorofumaronitrile, dichloromaleonitrile or mixtures of these new compounds may be utilized for the production of tetrachlorosuccinonitrile (perchlorosuccinonitrile) a unique and useful compound and chemical intermediate disclosed and claimed in the application of Oliver W. Cass and Harry B. Copelin, Serial No. 559,834, filed October 21, 1944, now U. S. P. 2,422,528. In the above-identified application, which describes the production of tetrachlorosuccinonitrile by reacting succinonitrile with chlorine in the vapor phase, it is disclosed that one of the preferred methods for obtaining tetrachlorosuccinonitrile comprises reacting the chloronitriles which are the subject of the present invention with chlorine in the vapor phase.

The new compounds of the present invention are also useful as solvents for many organic compounds not readily dissolved by commonly used solvent materials.

An analysis of my novel products was made in order to complete the identification. The following results were obtained:

| Compound | Percentage by Weight | | | |
|---|---|---|---|---|
| | Nitrogen | | Chlorine | |
| | Calculated | Found | Calculated | Found |
| | Per cent | Per cent | Per cent | Per cent |
| NCCH=CClCN | 23.2 | 24.9 | 31.6 | 34.4 |
| NCCCl=CClCN (liquid) | 19.0 | 18.72 | 48.2 | 47.46 |
| NCCCl=CClCN (solid) | 19.0 | 18.73 | 48.2 | 48.02 |

These new compounds, monochloromaleonitrile, monochlorofumaronitrile, dichloromaleonitrile and dichlorofumaronitrile, may be represented by the general formula NCCX=CClCN wherein X may be hydrogen or chlorine. Thus, in the appended claims this general formula is intended to include the stereo isomers of the monochloro and dichloro nitriles obtained in accordance with my invention.

Various modifications of my invention may be made without departing from the scope thereof as defined in the claims.

I claim:

1. Process for the production of unsaturated chloronitriles which comprises reacting succinonitrile with chlorine in the liquid phase at temperatures of about 60° to about 150° C. and recovering unsaturated chloronitriles.

2. Process for the production of unsaturated monochloronitriles which comprises reacting succinonitrile with chlorine in the liquid phase in the presence of light wherein the molar ratio of succinonitrile to chlorine is substantially 1 to 2 at temperatures of about 60° to about 150° C., the solvent for the reaction medium consisting essentially of molten succinonitrile and recovering unsaturated monochloronitriles.

3. Process for the production of unsaturated dichloronitriles which comprises reacting succinonitrile with chlorine in the liquid phase in the presence of light wherein the molar ratio of succinonitrile to chlorine is substantially 1 to 3 at temperatures of about 60° to about 150° C., the solvent for the reaction medium consisting essentially of molten succinonitrile and recovering unsaturated dichloronitriles.

4. Process for the production of unsaturated chloronitriles which comprises reacting succinonitrile with chlorine in the liquid phase, the solvent for the reaction consisting essentially of molten succinonitrile at temperatures of about 60° to about 150° C. and recovering unsaturated chloronitriles.

5. Process for the production of unsaturated chloronitriles which comprises reacting succinonitrile with chlorine in the liquid phase in the presence of light at temperatures of about 60° to about 150° C. and recovering unsaturated chloronitriles.

6. Process for the production of unsaturated monochloronitriles which comprises reacting succinonitrile with chlorine in the liquid phase in the presence of light wherein the molar ratio of succinonitrile to chlorine is substantially 1 to 2 at temperatures of about 60° to about 150° C. and recovering unsaturated monochloronitriles.

7. Process for the production of unsaturated dichloronitriles which comprises reacting succinonitrile with chlorine in the liquid phase in the presence of light wherein the molar ratio of succinonitrile to chlorine is substantially 1 to 3 at temperatures of about 60° to about 150° C. and recovering unsaturated dichloronitriles.

8. Process for the production of unsaturated chloronitriles which comprises reacting succinonitrile with chlorine in the liquid phase in the presence of light wherein the temperature of the reaction mixture is initially adjusted to about 60° C. and gradually increased during the reaction until a temperature of about 150° C. is attained, maintaining the temperature at about 150° C. until the reaction is complete, as evidenced by lack of further evolution of hydrogen chloride, and recovering unsaturated chloronitriles from the reaction mixture.

OLIVER W. CASS.

REFERENCES CITED

The following references are of record in the file of this patent:

UNITED STATES PATENTS

| Number | Name | Date |
|---|---|---|
| 2,174,737 | Coleman et al. | Oct. 3, 1939 |
| 2,174,756 | Pieroh | Oct. 3, 1939 |
| 2,297,564 | Kirkbride | Sept. 29, 1942 |

FOREIGN PATENTS

| Number | Country | Date |
|---|---|---|
| 814,093 | France | June 14, 1937 |
| 842,186 | France | June 7, 1939 |